US011106809B2

(12) United States Patent
Kasiviswanathan et al.

(10) Patent No.: US 11,106,809 B2
(45) Date of Patent: Aug. 31, 2021

(54) PRIVACY-PRESERVING TRANSFORMATION OF CONTINUOUS DATA

(71) Applicant: Samsung Electronics Co., Ltd., Suwon-si (KR)

(72) Inventors: Shiva Kasiviswanathan, Mountain View, CA (US); Hongxia Jin, Mountain View, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 1010 days.

(21) Appl. No.: 15/393,085

(22) Filed: Dec. 28, 2016

(65) Prior Publication Data

US 2018/0181878 A1   Jun. 28, 2018

(51) Int. Cl.
*G06N 20/00* (2019.01)
*G06F 21/62* (2013.01)

(52) U.S. Cl.
CPC ...... *G06F 21/6218* (2013.01); *G06F 21/6245* (2013.01); *G06N 20/00* (2019.01)

(58) Field of Classification Search
CPC .. G06N 20/00; G06N 99/005; G06F 21/6245; G06F 21/57; G06F 11/30; H04L 29/06; H04L 29/08
USPC .......................................................... 706/12
See application file for complete search history.

(56) References Cited

U.S. PATENT DOCUMENTS

| 7,630,986 | B1 | 12/2009 | Herz et al. |
|---|---|---|---|
| 8,176,563 | B2 | 5/2012 | Redlich et al. |
| 8,764,651 | B2 | 7/2014 | Tran |
| 9,002,085 | B1 | 4/2015 | Solanki et al. |
| 9,028,405 | B2 | 5/2015 | Tran |
| 9,043,250 | B2 | 5/2015 | Ling et al. |
| 9,107,586 | B2 | 8/2015 | Tran |
| 9,225,793 | B2 | 12/2015 | Dutta et al. |
| 10,504,154 | B1* | 12/2019 | Bonawitz ............ G06Q 30/0261 |
| 2012/0197856 | A1 | 8/2012 | Banka et al. |
| 2013/0010949 | A1 | 1/2013 | Chang et al. |
| 2013/0300574 | A1 | 11/2013 | Gillette, II |
| 2015/0199010 | A1* | 7/2015 | Coleman ............... A61B 5/0006 345/156 |
| 2015/0261959 | A1* | 9/2015 | Ukil .................... G06F 11/3024 726/25 |
| 2015/0286827 | A1* | 10/2015 | Fawaz ..................... H04L 9/00 726/26 |
| 2017/0337487 | A1* | 11/2017 | Nock ........................ G06N 3/08 |
| 2018/0173894 | A1* | 6/2018 | Boehler .............. H04W 12/001 |

OTHER PUBLICATIONS

Rastogi, "Differentially Private Aggregation of Distributed Time-Series with Transformation and Encryption", SIGMOD'10, Jun. 6-11, 2010, Indianapolis, Indiana, USA. (Year: 2010).*
Zhou, "Compressed Regression", IEEE Transactions on Information Theory, 2008. (Year: 2008).*

(Continued)

*Primary Examiner* — Dave Misir (57) ABSTRACT

A data processing method receives a set of time-series user data and also receives a privacy requirement of the time-series user data. Next, the time-series user data is transformed using the privacy requirement such that the transforming satisfies differential privacy.

17 Claims, 10 Drawing Sheets

(56) References Cited

OTHER PUBLICATIONS

Ringne, "Compression and Privacy Preservation of Data Streams using Moments", International Journal of Machine Learning and Computing, vol. 1, No. 5, Dec. 2011. (Year: 2011).*

Mukherjee, "A privacy-preserving technique for Euclidean distance-based mining algorithms using Fourier-related transforms", The VLDB Journal (2006). (Year: 2006).*

Rastogi, "Differentially Private Aggregation of Distributed Time-Series with Transformation and Encryption", SIGMOD'10, Jun. 6-11, 2010, Indianapolis, Indiana, USA. (Year: 2010) (Previously supplied).*

Zhou, "Compressed Regression", IEEE Transactions on Information Theory, 2008. (Year: 2008) (Previously supplied).*

Ringne, "Compression and Privacy Preservation of Data Streams using Moments", International Journal of Machine Learning and Computing, vol. 1, No. 5, Dec. 2011. (Year: 2011) (Previously supplied).*

Mukherjee, "A privacy-preserving technique for Euclidean distance-based mining algorithms using Fourier-related transforms", The VLDB Journal (2006). (Year: 2006) (Previously supplied).*

Hamm, "Crowd-ML: A Privacy-Preserving Learning Framework for a Crowd of Smart Devices", 2015 IEEE 35th International Conference on Distributed Computing Systems. (Year: 2015) (Previously supplied).*

Shi, "Privacy-Preserving Aggregation of Time-Series Data", The 18th Annual Network & Distributed System Security Symposium (NDSS), San Diego, California, USA, Feb. 6-9, 2011. (Year: 2011) (Previously supplied).*

Saleheen, "mSieve: Differential Behavioral Privacy in Time Series of Mobile Sensor Data", UBICOMP'16, Sep. 12-16, 2016, Heidelberg, Germany. (Year: 2016) (Previously supplied).*

Liu, "Random Projection-Based Multiplicative Data Perturbation for Privacy Preserving Distributed Data Mining", IEEE Transactions on Knowledge and Data Engineering, vol. 18, No. 1, Jan. 2006. (Year: 2006) (Previously supplied).*

Eldar, Y. C., & Kutyniok, G. (Eds.). Compressed Sensing: Theory and Applications. Cambridge University Press, 2012.

Bassily, R., Smith, A., & Thakurta, A. Differentially Private Empirical Risk Minimization: Efficient Algorithms and Tight Error Bounds, In Foundations of Computer Science (FOCS), 2014 IEEE 55th Annual Symposium on (pp. 464-473). IEEE, Oct. 21, 2014.

Talwar, K., Thakurta, A., & Zhang, L. Private Empirical Risk Minimization Beyond the Worst Case: The Effect of the Constraint Set Geometry., downloaded Nov. 20, 2016.

* cited by examiner

PRIVACY-PRESERVING TRANSFORMATION OF CONTINUOUS DATA

FIELD OF THE INVENTION

Various embodiments of the present invention relate generally to data processing. More specifically, some embodiments of the present invention relate to transforming user data to preserve privacy without impacting the result of machine learning tasks using such data.

BACKGROUND OF THE INVENTION

The past few years have seen an explosion in the time-series data generated by wearable devices; sensors deployed at home, machines, etc. Therefore, handling large volumes of time-series data has become a growing concern. The problem is additionally challenging because these data streams are highly dimensional, and the curse of dimensionality is a well-established obstacle in time-series analysis affecting aspects such as the accuracy, computation time, storage space, and communication cost of many common task performed on these data streams.

For one, machine-learning tasks are frequently run on continuous data streams to extract valuable insights and to provide useful services. For example, health related wearable data can be used for providing personalized health-related offerings, data generated by "smart" televisions can help in better program recommendation, targeted advertising, etc. Since generating advanced and robust machine-learned models requires combining data from multiple users, the training procedure is typically run on the cloud server. This, however, creates a challenge, as transmitting large volumes of high-dimensional data continuously to the cloud is prohibitively expensive.

One additional challenge in this setting is that many of these data streams contain individual user's sensitive personal data, e.g., consider streams generated from a heart rate monitor or activity tracker. Therefore, it is also needed that the data analysis framework should be able to protect user's personal information. In some scenarios, a need for privacy may also arise because of legal requirements (such as when dealing with patient health data as mandated by the HIPAA law).

Therefore, what is needed is the ability to combine data compression along with privacy, and to provide an efficient and lightweight framework that is also suitable for wearable and mobile devices.

SUMMARY OF THE INVENTION

A data processing method receives a set of time-series user data and also receives a privacy requirement of the time-series user data. Next, the time-series user data is transformed using the privacy requirement such that the transforming satisfies differential privacy.

A non-transitory processor-readable medium includes a program that, when executed by a processor, performs a method that receives a set of time-series user data and also receives a privacy requirement of the time-series user data. Next, the time-series user data is transformed using the privacy requirement such that the transforming satisfies differential privacy.

An apparatus that transforms data includes an input that receives a set of time-series user data and that receives a privacy requirement of the time-series user data. The apparatus is configured to transform the time-series user data using the privacy requirement such that the transforming satisfies differential privacy.

This summary is provided merely to produce certain concepts and not to identify any key or essential features of the claimed subject matter. Many of the features and embodiments of the invention will be apparent from the company drawings and from the following detailed description.

BRIEF DESCRIPTION OF THE DRAWINGS

Accompanying drawings show one or more embodiments; however, the accompanying drawings should not be taken to limit the invention to only the embodiments shown. Various aspects and advantages will become apparent upon review of the following detailed description and upon reference to the drawings in which.

DETAILED DESCRIPTION OF THE INVENTION

One embodiment provides a device and method for privacy-preserving transformation on continuous data streams that enables resource efficient machine learning. In one embodiment, the raw time series data may first be compressed on the device (mobile, wearable, etc.) before transmission to the cloud. Depending on the setting, whether the cloud is trusted or untrusted, the privacy transformation of the compressed data takes place either in the cloud or on the device, respectively. In one embodiment, the machine learning analytics are executed in the cloud on the resulting compressed plus privacy-transformed data. One advantage is that while the raw data contains visible user information, the privacy transformation of that raw data renders the resulting data opaque. In other words, no sensitive user data may be discerned from the privacy-transformed data. In one embodiment, the notion of differential privacy is used as privacy definition for privacy transformation which ensures that the loss of user sensitive information is minimal even if an adversary gets access to the privacy-transformed data. Differential privacy provides the strongest and most rigorous privacy guarantee.

One embodiment provides a novel framework enabling machine learning tasks (such as classification, regression, clustering etc.) on continuous data streams that achieves both computational efficiency in terms of resources and also prevents leakage of private information. One embodiment uses a lightweight compression scheme based on random projection that reduces the dimensionality of the data on the device before transmission to the cloud. Based on the needs of the use case, the compression scheme may be optional. The privacy protection can be applied either on the device or at the cloud. While simultaneously gaining in computational efficiency and guaranteeing privacy, various embodiments ensure that the results of the machine learning analytics achieve the user/service specified desired level of accuracy. Embodiments are applicable to different types of data and are suitable for deployment on mobile devices.

Data is continuously generated by modern data sources such as wearable devices, sensors, etc. One embodiment deals with a general framework for learning from large volumes of time-series data streams. The privacy constraint arises either because of user demand or to satisfy legal requirements (such as the HIPAA law). The compression scheme, of one embodiment, which takes place on the device, may be used in many wearable devices, mobile devices, etc. In one embodiment, a second device (e.g., a cloud server) is allowed to efficiently collect user data and to learn (i.e., perform tasks such as regression, classification, etc.) from the data without violating any individual's privacy. One embodiment is modular enough, allowing for controllable frequency of transmission, choice of parameters, and use of compression, all based on the needs of the use case scenario.

There are numerous schemes for data compression. For example, a naïve alternative to embodiments of the present invention would be to sub-sample the data at the device and transmit only this sample to the cloud. While such schemes could also lead to computational resource savings, they would substantially affect the performance (accuracy) of the machine learning algorithms applied on this sampled data. One embodiment achieves computational savings while maintaining the performance of the machine learning algorithms by using a clever compression scheme.

Embodiments of the invention include new features such as: the compression reduces communication cost and leads to substantial savings in resources such as storage space and processing time; the privacy guarantee ensures that users' private information are not leaked (based on the guarantees of differential privacy); the framework enables accurate and efficient machine learning analytics; the framework guides users about how their choice of parameters affect the performance of the provided services; and, the framework allows frequency of data transmission to be domain and service independent.

Many improvements are provided, such as: the compression scheme is based on random projections, which operates on the first device (wearable device, mobile device, etc.), and reduces the communication cost and leads to substantial savings in resources such as storage space and processing time. Further, the privacy transformation may be performed either on the first device or the second. And, the machine learning tasks (such as classification, regression, etc.) are executed on the resulting compressed plus privacy transformed data. By using a series of novel techniques, embodiments of the present invention preserve the quality of the machine learning tasks, while guaranteeing privacy and gaining in efficiency.

Due to the above features and improvement, embodiments have the following advantages: an embodiment requires no architectural change of existing applications; an embodiment is scalable and stable for real-world deployment; an embodiment achieves desirable accuracy which is mathematically provable; the scheme is oblivious to the data set, meaning that the scheme does not require any prior knowledge of the data set as input; an embodiment leads to substantial reduction in resources such as computation time, storage space, and transmission bandwidth; on the device side, the compression scheme can be carried out locally by the participating parties, independent of others; in some scenarios, the first device can also pass some auxiliary information to the second device (server) so that the second device can provide a better service (machine learning analytics) than a third party that eavesdrops on the data transmitted by the first device; and, parameters used can change based on the device type (e.g., wearable devices, home sensors) and different types of information so that even for the same device, the compression can be different based on the content.

There are various embodiments of our invention. Some embodiments involve untrusted cloud, and some involve trusted cloud. Correspondingly, the privacy transformation may happen on the device (for example, untrusted scenario) or in the cloud (for example, trusted scenario). In one embodiment, compression can be omitted based on the service (machine learning analytics) needs. There are also controllable parameters discussed below.

Untrusted Server Embodiment

Figure 1:
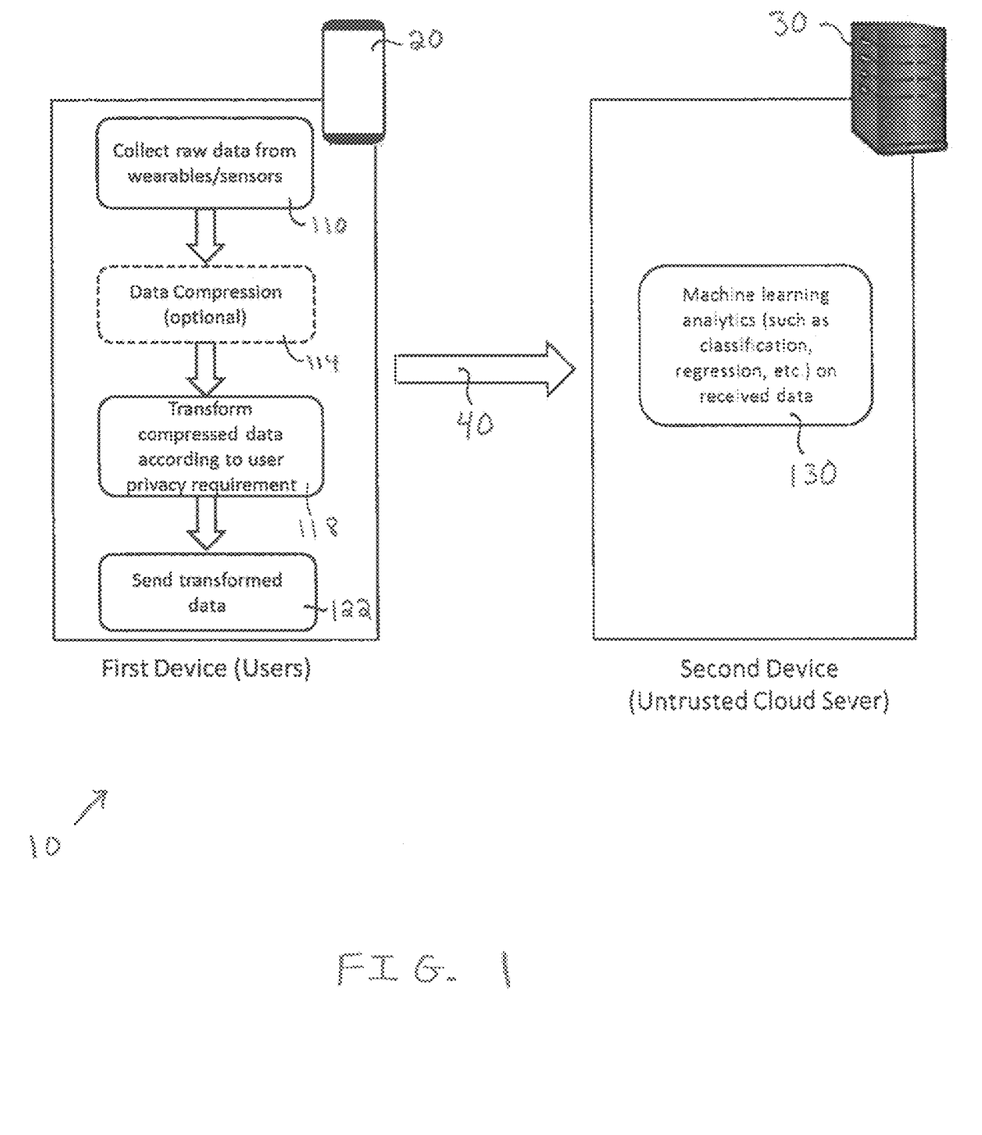
FIG. 1 is a block diagram showing an untrusted server embodiment.

FIG. 1 is a block diagram showing an untrusted server embodiment 10. In this first embodiment, each user specifies his or her own personal privacy requirement. Shown is a first device, a mobile device 20, which may be any portable electronic device in possession of a user, such as a mobile telephone, an electronic wristwatch, a wearable device such as any of the devices worn about the wrist (to monitor a user's pulse, etc.) or worn around the chest (to monitor a user's heart rate), a pair of glasses that incorporate a camera or other computer and communications technology, etc. This device collects via any internal or external sensor a continuous stream of data concerning information such as the local environment and/or the user's body. Device 20 may also be any suitable electronic device capable of sensing and transmitting data such as the home sensors of FIG. 7 or the home appliances of FIG. 8.

Also shown is a second device, a cloud server 30, which may be any remote computer server accessible by the mobile device 20. Communication link 40 is typically any wireless communication channel by which data from the mobile device may be transmitted to the remote computer server 30, although in one embodiment a wired connection may be used.

The first device 20 can also pass auxiliary information (such as the user privacy parameter) to the second device 30 (server) so that the second device can provide better service than a third party that might steal the data transmitted by the first device.

In step 110, the first device 20 (e.g., a wearable device, mobile telephone) collects raw data from a user or his or her environment that is preferably continuous time series data.

Optional Compression Embodiment

Next, in an optional step 114, the first device 20 compresses the raw data as described below.

Figure 2:
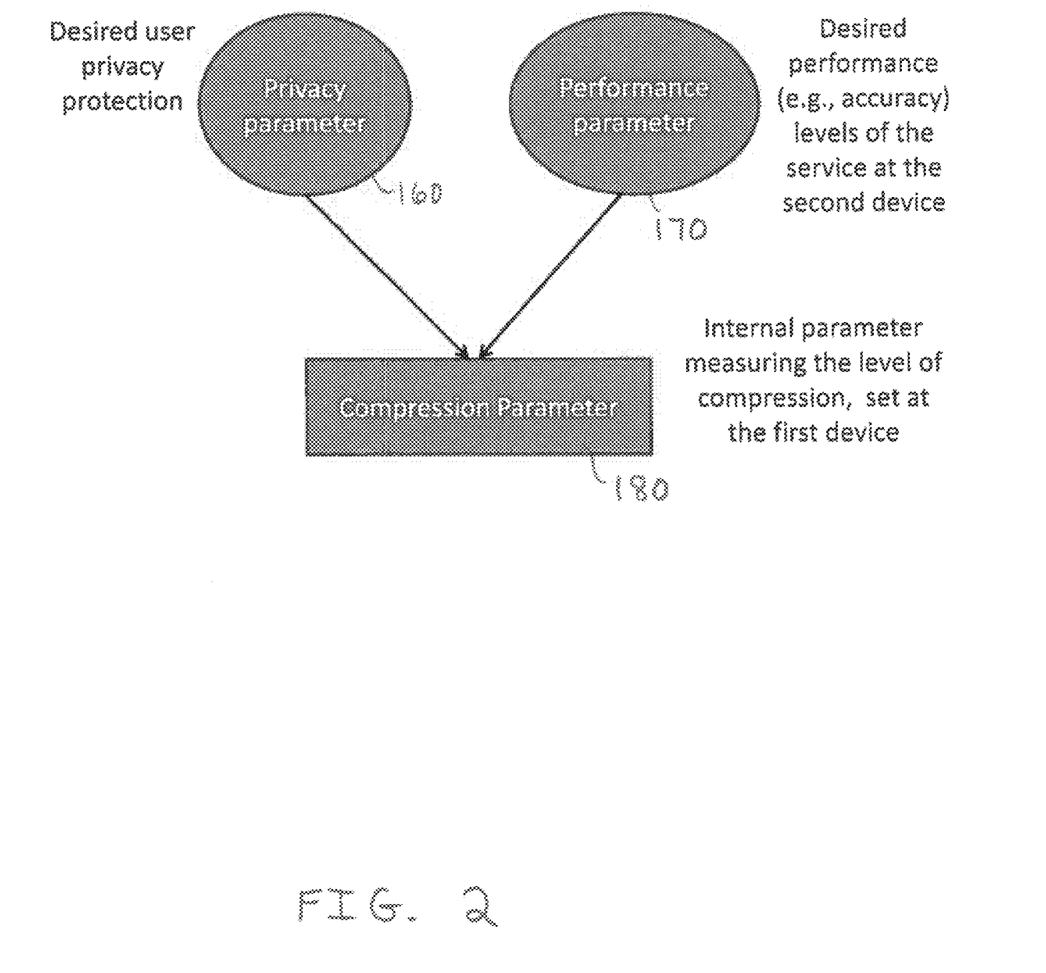
FIG. 2 is a block diagram of how a compression parameter is obtained.

FIG. 2 is a block diagram of how a compression parameter is obtained. There can be two user-controllable parameters: a) user-desired privacy protection and b) desired performance levels of the desired service at the second device. Based on these user-controllable parameters, an internal compression parameter, which regulates the amount of compression, is set automatically by the first device. In general, if higher levels of privacy and accuracy are desired, then the compression parameter is set higher (i.e., less compression). On the other hand, for a given level of performance or accuracy desired by the machine learning analytics on the server computer, a lower level of privacy desired means that the compression parameter may be set lower (i.e., more compression of the user data). The controllable parameters can be changed based on the device type (e.g., wearable devices, home sensors) and different type of information so that even for the same device, a compression parameter can be different based on the content.

In one embodiment, each user of a mobile device 20 preferably provides their own privacy parameter by entering an indicator on their device (e.g, a number, that smaller number indicates more privacy desired). In one embodiment, the performance parameter is a global parameter applicable to all mobile devices and is preferably provided by an administrator of the system or by the machine learning analytics application 130. In one embodiment, the privacy parameter may also be a number or value that is dictated by law, in which case it is not input by a user, but is a default value.

More specifically, in one embodiment, the privacy parameter 160 is a number indicating the desired level of user privacy, with lower values indicating the desire for stronger (higher level of) privacy. In one embodiment, performance parameter 170 is a number measuring the performance of the machine learning analytics, with a larger value indicating better performance or accuracy. In one embodiment, the compression parameter 180 is an internal parameter that is, for example, between 0 and 1, with larger values indicating lower compression. If the compression parameter is 1, then there is no compression of the data; if the compression parameter is 0 then nothing would be sent.

If the compression module is enabled, in one embodiment, then the compression parameter is set to the smallest value possible (i.e., maximum possible compression) that is achievable with the desired privacy and accuracy guarantees. For example, with desired privacy parameter $\epsilon$ and accuracy parameter $\alpha$, the compression parameter can be set as at least the minimum of $\epsilon$ and $\alpha$. If compression module is not enabled in the invention then it is equivalent to setting the compression parameter as 1. Because it has been shown in machine learning on compressed data that the higher the compression ratio the lower the training accuracy rate, it may be desirable to have a lower compression ratio if higher accuracy is desired.

As mentioned, compression on the first device is optional and is performed on the raw data. In one embodiment, data compression is based on the technique of random projections, a technique where the original high-dimensional data is projected onto a lower-dimensional subspace using some appropriately chosen random matrix. Other possible compression techniques include sub-sampling based techniques which in general do not provide the desired guarantees of accuracy for the service provided on the second device.

Figure 3:
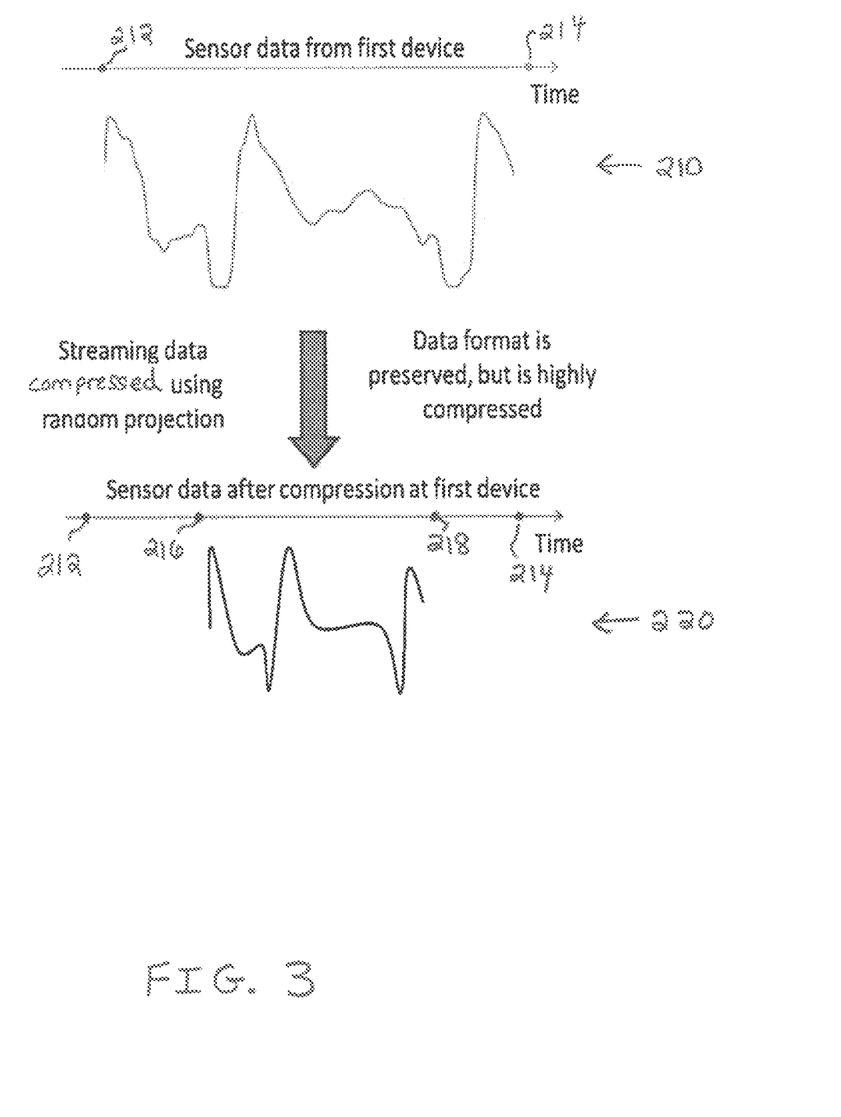
FIG. 3 illustrates an example of compression using random projections.

FIG. 3 illustrates an example of compression using random projections.

Shown is a graph 210 of sensor data from a first device over a time interval (212, 214). Graph 220 illustrates the sensor data after compression which is now within the time interval (216, 218); advantageously, the data format is preserved, i.e., the shape of the two graphs is similar even though the latter is compressed in time.

If $x \in R^d$ represents a time-series data stream 210 generated over some time interval (212-214), then we compress x by pre-multiplying it with a random matrix $\Phi$, where $\Phi \in R^{m \times d}$. In other words, each element in the random matrix $\Phi$ is from a normal distribution N $$\left(0, \frac{1}{m}\right).$$

The random matrix may be generated in multiple ways. Note that if x is d-dimensional, transmitting x to the second device takes O(d) bits of communication, whereas form <<d, transmitting $\Phi$x to the second device only takes O(m) bits of communication. Therefore, for each x, the communication cost reduces by a factor d/m. On mobile devices, reducing the communication load also leads to other advantages such as battery power saving. After compression, the data 220 is now over interval 216-218.

Random projections are: simple and a computationally light technique, leading to communication and memory savings; have impressive empirical results; and provide mathematical guarantees of some desirable properties. Thus, random projections preserve the structure of the data, and hence can be used to reduce the cost of common machine learning tasks (such as classification, regression, etc.) perceptibly without affecting the accuracy. In addition, it is believed that random projections work best on continuous time series data streams.

Figure 4:
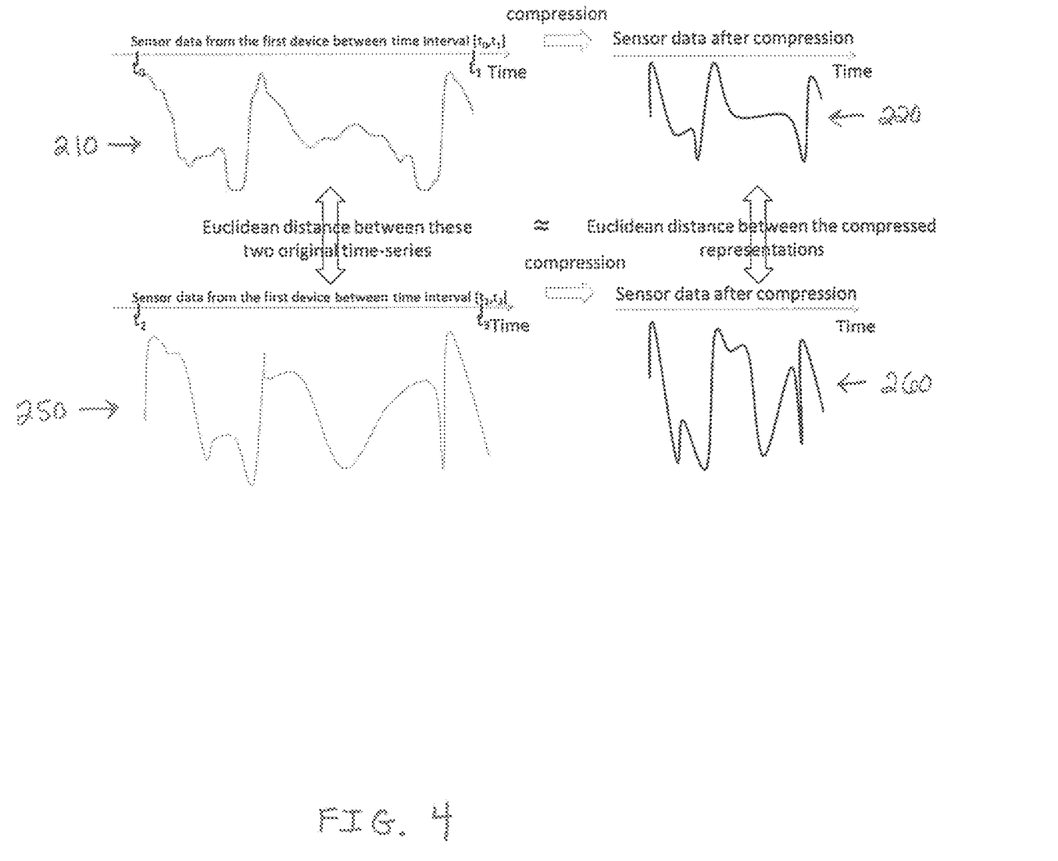
FIG. 4 illustrates the Euclidean distance between original sensor data and between compressed sensor data.

FIG. 4 illustrates the Euclidean distance between original sensor data (210, 250) and between compressed sensor data (220, 260). More concretely, let x, $z \in R^d$ represent two time-series data streams (210, 250) generated over some time interval. Then the random projections of x and z which is $\Phi$x and $\Phi$z, respectively preserves the structure of the inputs in the following two ways: a) the Euclidean distance between the compressed data, $\Phi$x and $\Phi$z, is approximately the same as that between the original data, x and z, and b) the angle between the compressed data, $\Phi$x and $\Phi$z, is approximately same as that between the original data, x and z. The Euclidean distance between two points is the length of the path connecting them, and the angle between two vectors refers to the cosine angle. These two properties play an important role in establishing that compression using random projections preserves the accuracy of many common machine learning tasks when using compressed data.

Specific Examples of Transformation

Returning now to FIG. 1, next, in step 118, the data (compressed or not) is transformed. In one embodiment, depending upon whether the server is trusted or untrusted, the transformation for privacy may take place either on the server or on the first device, respectively. In either case, the privacy transformation satisfies the definition of differential privacy. The resulting transformed data is then used for machine learning tasks on the electronic device, on the computer server, or at a server of a third party.

Figure 9:
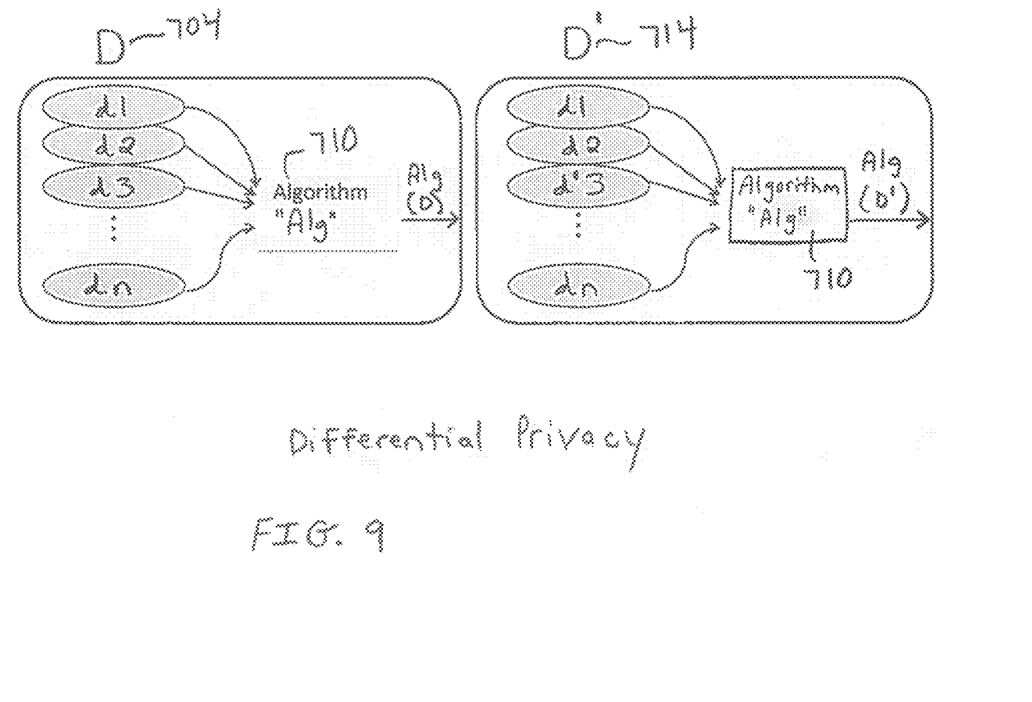
FIG. 9 illustrates differential privacy.

FIG. 9 illustrates differential privacy. Shown is a database D 704, having elements d1, d2, d3, . . . , dn, and a database D' 714 which is identical to D in all but one entry (in 714, this is the $3^{rd}$ entry, which is d3 in D and d3' in D'). The symbols, $\epsilon$ and $\delta$, are positive real numbers which represent user privacy parameters, algorithm Alg 710 is a randomized algorithm that takes a dataset as input. A randomized algorithm Alg 710 is ($\epsilon, \delta$)-differentially private if for all databases D, D' that differ on a single element (i.e., the data of one person), and for all subsets S in the output space of Alg (i.e., the image of Alg), $$\Pr[Alg(D) \in S] \leq \exp(\epsilon) \times \Pr[Alg(D') \in S] + \delta$$

where the probability Pr[ ] is taken over the randomness used by the algorithm. Thus, differential privacy is a condition on the release mechanism (i.e., the trusted party releasing information about the dataset) and not on the dataset itself. Intuitively, this means that for any two datasets that are similar, a given differentially private algorithm will behave approximately the same on both datasets. The definition gives a strong guarantee that presence or absence of an individual will not affect the final output of the algorithm significantly.

Table 1 shows exemplary steps for transformation for privacy with or without compression. The transformation may happen on either the first device or on the second device (for example, if the second device is trusted). If compression is enabled then let $\Phi$ be a random projection matrix, if compression is not enabled, then the steps may still be performed, in this case $\Phi$ is set as an identity matrix.

TABLE 1

Privacy transformation with or without compression

Input: A dataset $x_1, x_2, \ldots, x_n$ of n datapoints in $R^d$
Output: A dataset $\hat{x}_1, \hat{x}_2, \ldots, \hat{x}_n$ of compressed (optional) and privacy transformed data
If compression is enabled: Let $\Phi$ be a random projection matrix
Part a: Generate $\Phi x_1, \ldots, \Phi x_n$ in $R^m$
Part b: Generate $\hat{x}_i$ from $\Phi x_i$ by adding noise drawn from distributions satisfying differential privacy
If compression is not enabled, then the above steps can still be done, in this case $\Phi$ is set as an identity matrix By transforming the raw data during training a model, a model is constructed in which there is no discernible original user data. That is, a privacy transformation occurs that satisfies the concept of differential privacy.

Next, first device transmits the privacy-preserving transformed data to the second device (e.g., an untrusted cloud server) in step 122. Of course, any number of first devices will transmit privacy-preserving transformed data to a second device. Finally, in step 130, the second device collects the data transmitted by all of the first devices and performs machine learning analytics (such as classification, regression, etc.) on the received data using the model constructed.

Trusted Server Embodiment

Figure 5:
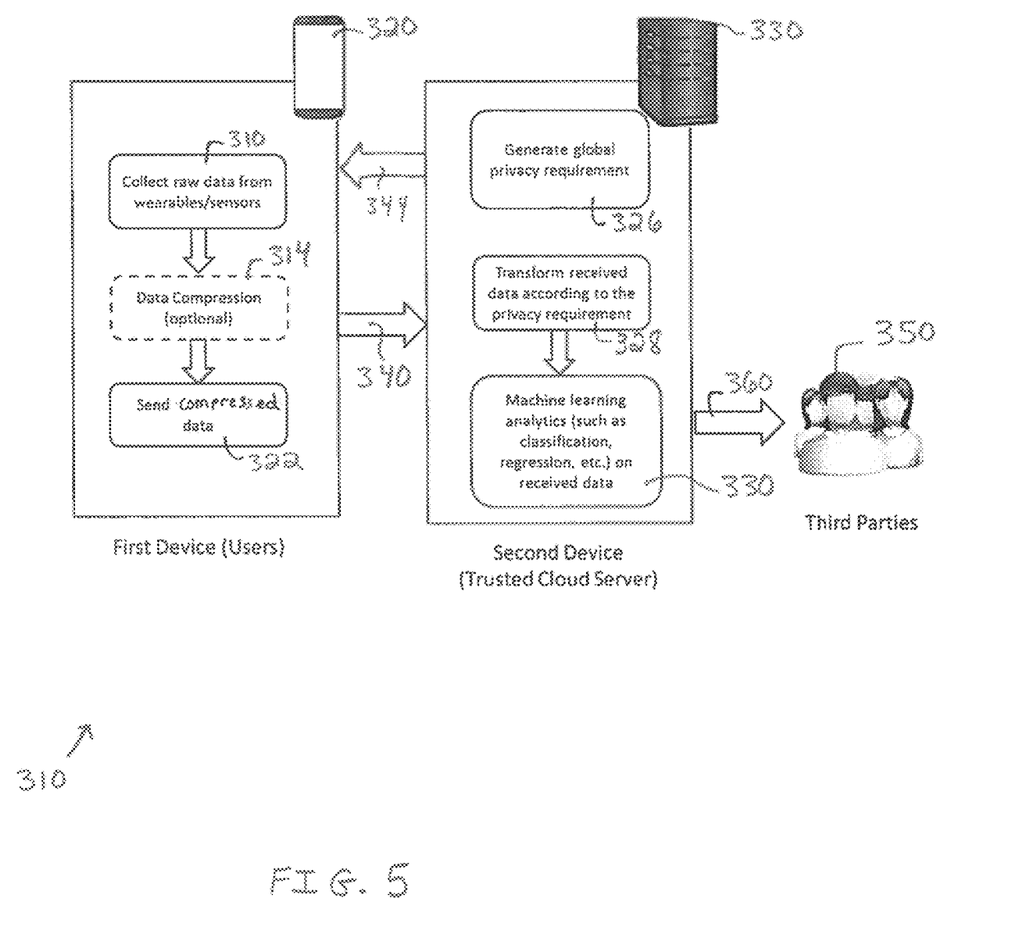
FIG. 5 is a block diagram showing a trusted server embodiment.

FIG. 5 is a block diagram showing a trusted server embodiment. Shown are device 320, server 330, links 340 and 344, link 360 and third parties 350. In this embodiment, the second device 330 is trusted (e.g., a server owned by a medical provider where devices 320 are associated with individual patients). The first device 320 and second device also coordinate on parameters so that quality of the services provided by the second device to the first device does not degrade. This embodiment also has all the merits of the earlier embodiment in terms of computational savings.

In this embodiment, the following steps are performed. The first device (e.g., a wearable device, smartphone, etc.) collects raw data in step 310. In an optional step 314 the first device compresses the raw data as explained above. In this embodiment, where the server is trusted, a global privacy requirement is first generated 326 on the trusted server and then transmitted over link 344 to all of the electronic devices 320. In this fashion, the global privacy requirement becomes the privacy parameter for all electronic devices 320. Next, in step 322, the first device transmits the data (compressed or not) to the second device via link 340. The second device (e.g., a trusted cloud server) collects the data transmitted by all the first devices. Next, in step 328, the second device transforms all of this received data to satisfy the privacy requirement. The transformation may be performed upon an individual set of data from a single device 320, or may be performed upon any accumulation of data from any of a number of devices.

In step 330, the second device performs machine learning analytics (such as classification, regression, clustering, etc.) on the transformed data. Finally, the results of these analytics are released to third parties 350 via a link 360.

The outputs produced by machine learning analytics include classification, regression, or clustering results. They also could be the parameters that underlie the models used for classification, regression, or clustering.

Third parties could include other providers and consumers of similar machine learning services.

In an alternative embodiment, server 330 performs the privacy preserving data transformation 328, but then the transformed data will be sent to a third party 350 for the machine learning analytic tasks to be performed on a computer.

Table 2 focuses on a class of machine learning tasks which is training a classification model from a set of training data. The exemplary procedure is described in the scenario where the server is trusted and compression is enabled. If compression is disabled then the random matrix $\Phi$ is replaced by an identity matrix.

Let $(x_1,y_1), \ldots (x_n,y_n)$ denote the raw (training) data generated by n first devices. For example, $x_1 \in R^d$ represents the heart rate measurement of user i over a time interval and $y_i$ could be an indicator variable for the activity user is undertaking. Training a model can be formalized as an optimization as follows. For a parameter $\theta \in R^d$, let $f(\theta,(x_i,y_i))$ be a convex (in the first parameter) loss function that measure the "fit" of the estimator $\theta$ on a single point $(x_i,y_i)$. Given $f(\bullet,\bullet)$ and a closed, convex set $\Theta \subset R^d$, the mathematical problem is to minimize $\Sigma_{i=1}^{n} f(\theta,(x_i,y_i))$ over $\theta \in \Theta$. Common choices for $f(\bullet,\bullet)$ include: a) linear regression captured by setting $f(\theta,(x,y))=(y-\langle x,\theta \rangle)^2$, b) logistic regression captured by setting $f(\theta,(x,y))=\ln(1+\exp(-y\langle x,\theta \rangle))$, and c) support vector machine captured by setting $f(\theta,(x,y))=$ hinge$(y\langle x,\theta \rangle)$ with hinge$(a)=1-a$ if $a \leq 1$ and 0 otherwise.

Thus, the interaction between a first device and the second device is given by the following steps. In step 314, each $x_1, \ldots, x_n$ is independently compressed by each first device into $\Phi x_1, \ldots, \Phi x_n$, where $\Phi \in R^{m \times d}$ is a random projection matrix. In step 322, the compressed data $(\Phi x_1,y_1), \ldots, (\Phi x_n,y_n)$ from n first devices is transmitted to the second device. So instead of the original data, the second device gets access to only $(\Phi x_1,y_1), \ldots (\Phi x_n,y_n)$. The second device collects the transmitted data from all the first devices. In steps 328 and 329, the second device trains a classification (for example) model using $(\Phi x_1,y_1), \ldots (\Phi x_n,y_n)$. In Table 2, we present a high-level example of the last step. The idea is to minimize the loss function $f(\bullet,\bullet)$ in the compressed domain (step a) (subject to a differential privacy constraint) and then do a "lifting" operation to an estimator $\hat{\theta} \in \Theta$ (Part b). The above approach constructs a model, whose training accuracy is comparable to the training on the raw data $(x_1,y_1), \ldots, (x_n,y_n)$. In other words, transformation of the raw data may occur during training of the model. Specifically, transformation occurs during Part a. Part b is where the model is constructed.

TABLE 2

Training classification (or regression) models on compressed data with privacy transformation on the second device.

Input: A dataset of $(\Phi x_1, y_1),..., (\Phi x_n, y_n)$ of n datapoints
Output: An estimate $\theta$ of $\text{argmin}_{\theta \in \Theta} \Sigma_{i-1}^n f(\theta, (x_i, y_i))$ for a convex (in the first parameter) loss function $f(\cdot,\cdot)$
Part a: Minimize the following problem subject to differential privacy constraint (privacy transformation takes place here)
  $\vartheta = \text{argmin}_{\theta \in \Phi\Theta} \Sigma_{i-1}^n f(\Phi\theta, (\Phi x_i, y_i))$
Part b: $\hat{\theta} = \text{argmin}_{\theta} ||\theta||_\Theta$ such that $\Phi\theta = \vartheta$ where $||\circ||_\Theta$ denotes the Minkowski norm

Use Cases

Below, we provide exemplary use cases that demonstrate the practical use of embodiments of the invention.

Figure 6:
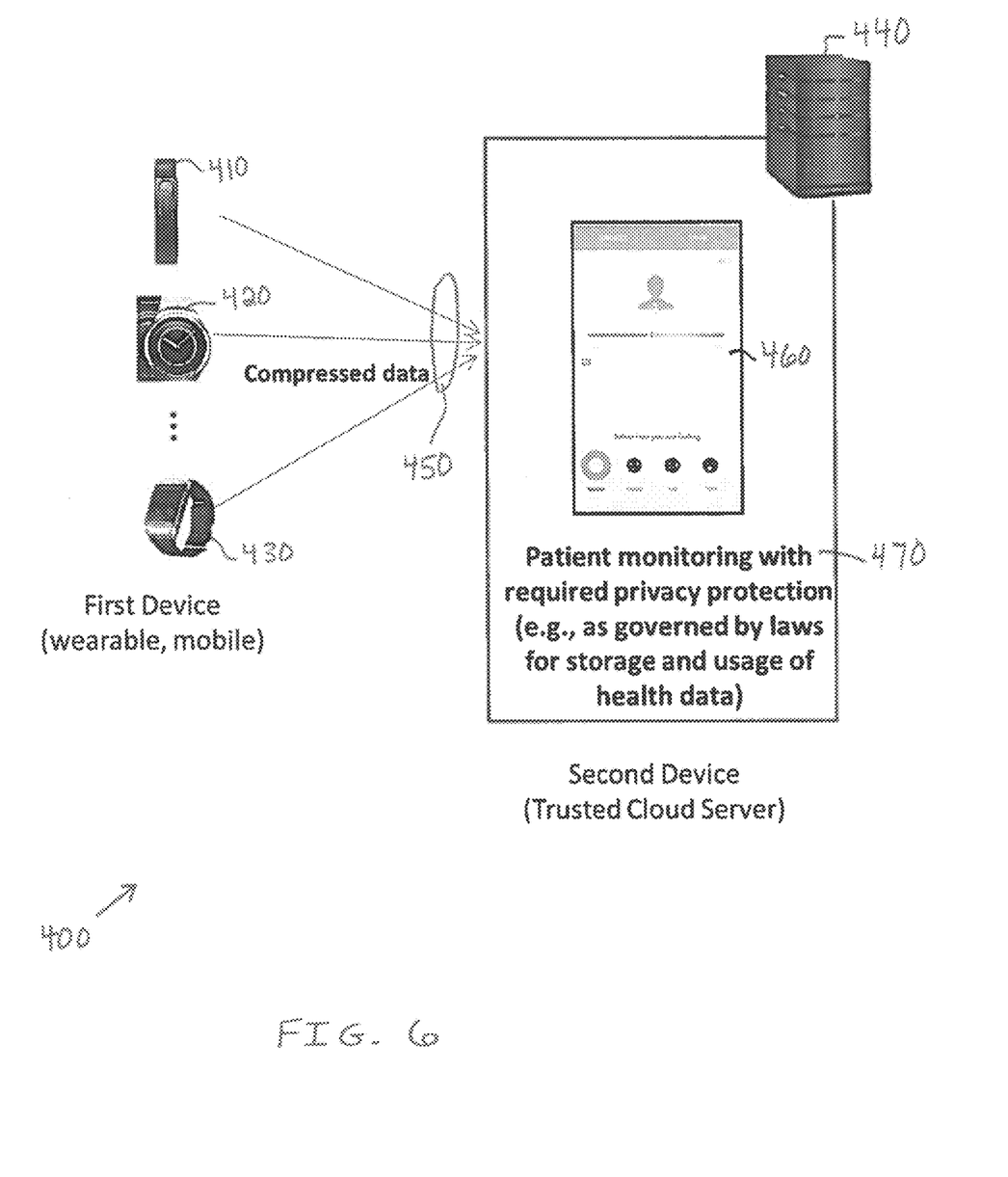
FIG. 6 illustrates a continuous patient monitoring use case.

FIG. 6 illustrates a continuous patient monitoring use case. The first device (410, 420, 430) (wearable, health sensor) transmits at regular intervals a highly compressed data stream 450 corresponding to health indicators such as heart rate, blood glucose, etc., to the second device 440. The second device 440 includes a software module 460 that includes the privacy transformation step and trained user models. This compressed and transformed data is used by the second device 440 (e.g., server at a medical provider) to continuously update user models that can be used to track individuals for any health anomalies. Machine learning analytics may then be performed on received transformed user data using one of the trained user models. While the second device is a trusted server in this example, the transformation of the data at the second device ensures that all mandated privacy requirements with respect to storage, usage, and sharing of the health data are met. The first device and second device can also coordinate on the parameters so that quality of the services provided by the second device to the first device does not degrade. The sensors on the first device that collect data include any health or fitness sensor which operate by recording various user measurements at periodic intervals.

Figure 7:
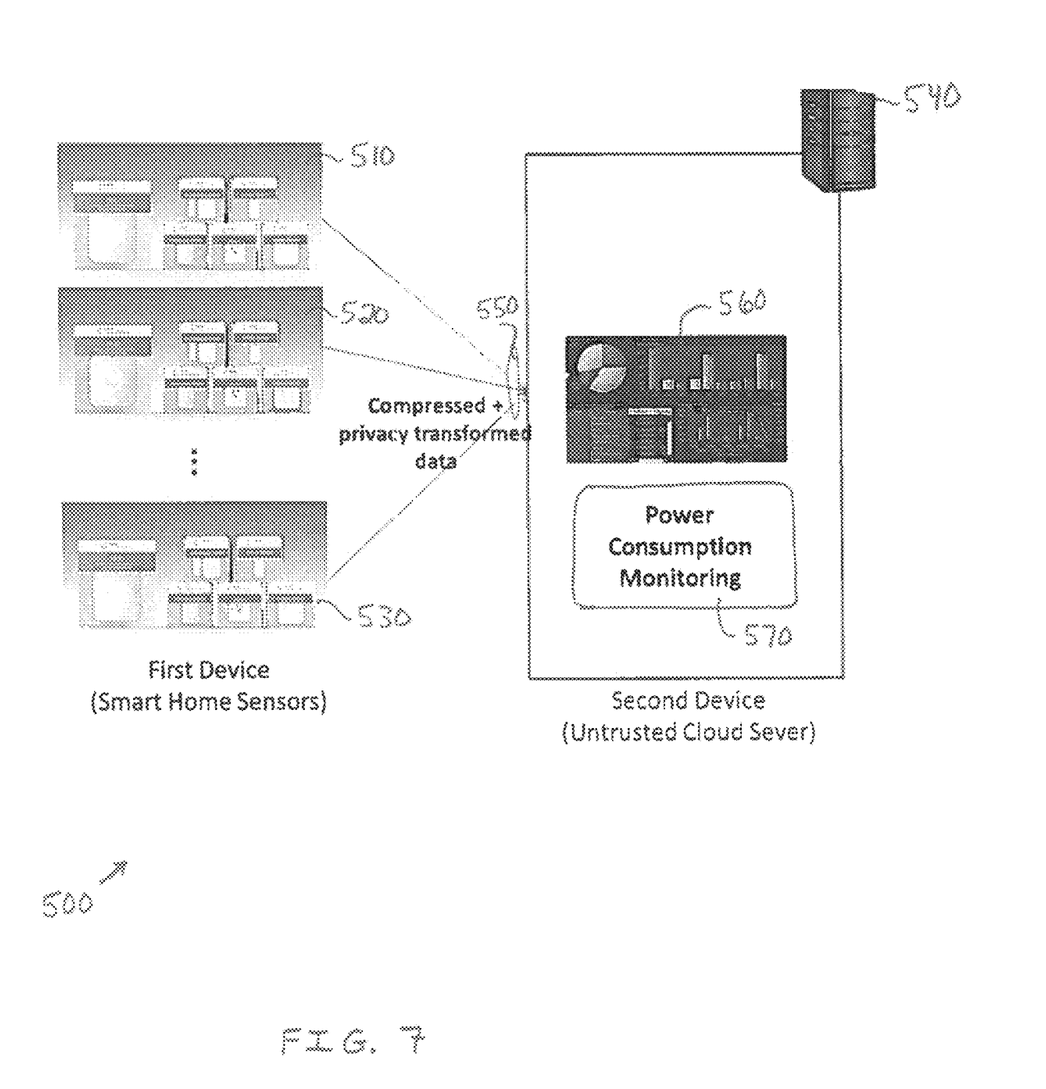
FIG. 7 illustrates a continuous power consumption monitoring use case.

FIG. 7 illustrates a continuous power consumption monitoring use case. Any number of sensors in a household are first devices 510-530. A second device 540 (e.g., computer server of a utility company) monitors power consumption of each household at regular intervals by getting data from the smart sensors. The sensor data is compressed and transformed on each first device, before being sent over link 550. Software module 570 monitors consumption and adjusts rates. Shown also is a user interface 560. Machine learning analytics may then be performed on received transformed data from the sensors. The consumption demands can be used to adjust the generation or to adjust time-based electricity rates without leaking any household's consumption behavior (e.g., whether a family is out of town). The compressed data transmission leads to substantial computational savings. The first device can also pass auxiliary information (such as the privacy parameter) to the second device (server) so that the second device can provide better service than a third party that steals/eavesdrops the data transmitted by the first device. The sensors on the first device that collect data include any power or smart meter sensor that takes periodic readings of the energy consumption at a home. Having access to the privacy parameter of the first device helps the second device to verify if desired accuracy levels have been met.

In this use case, the first device transmits at regular intervals (domain/service dependent) a highly compressed data stream indicating the power consumption (obtained from smart sensors) of each household. Private transformation at the first devices ensures that there is no leakage of any household's consumption behavior (e.g., whether a family is out of town).

Figure 8:
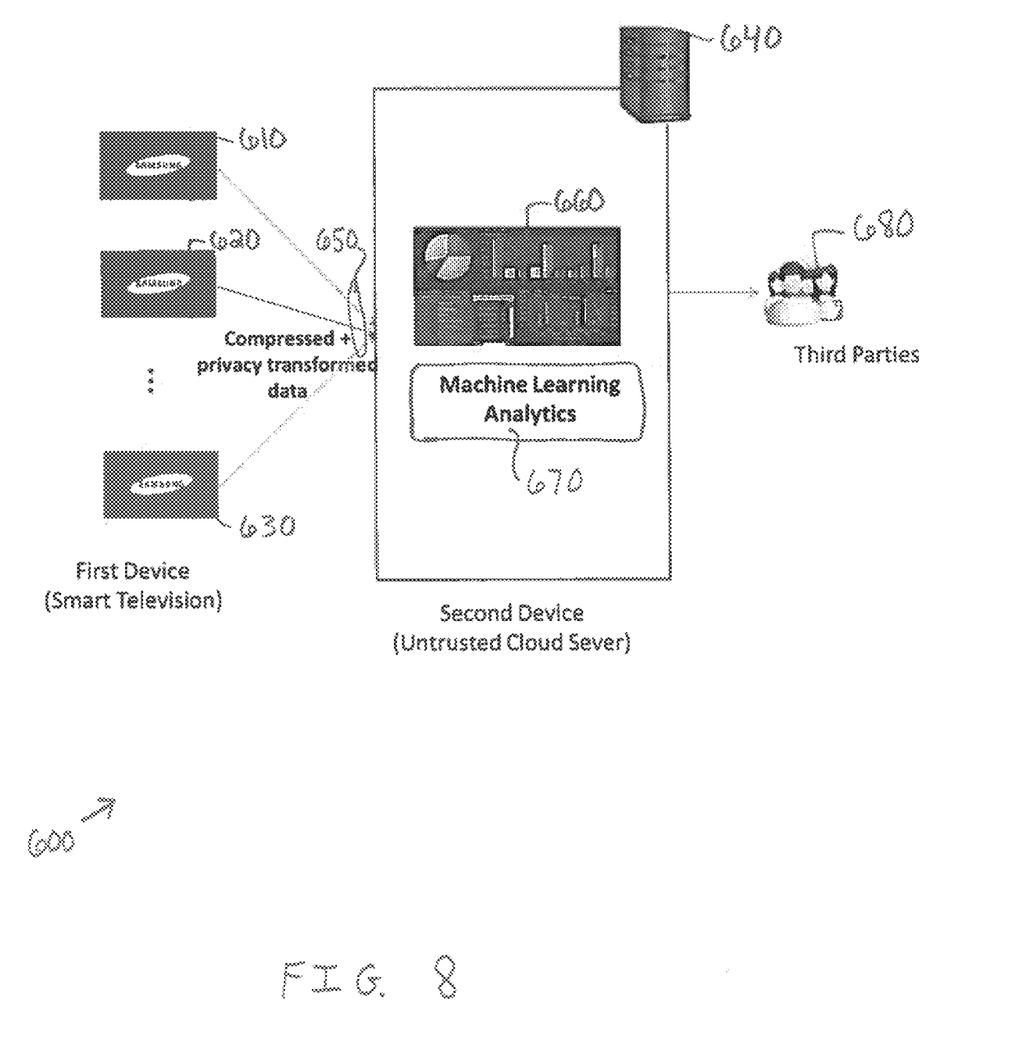
FIG. 8 illustrates a continuous data collection for data analytics and advertising use case.

FIG. 8 illustrates a continuous data collection for data analytics and advertising use case. A second device 640 (e.g., analytical data server) collects at regular intervals different statistics (e.g., different audience measurements, voice commands, network measurements) from so called "smart" televisions 610-630 (TVs) without learning users' sensitive demographic information. The statistical data from each device is transformed at each device, thus creating transformed data. The transformed data is then transmitted over link 650. With the collected statistics and models, the second device performs various data mining or other machine learning tasks and then disseminates them to third parties 680 for advertising purposes (for example). Software module 670 performs the analytics and also shown is a user interface 660. Again, the first and second device may coordinate by sharing parameters to achieve better results.

Computer System Embodiment

Figure 10A:
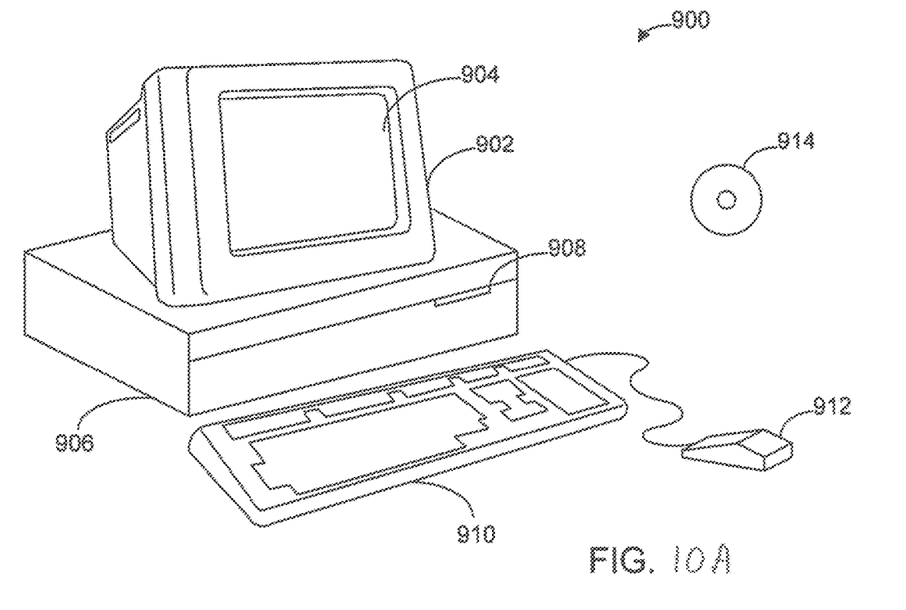
FIGS. 10A and B illustrate a computer system suitable for implementing embodiments of the present invention.
Figure 10B:
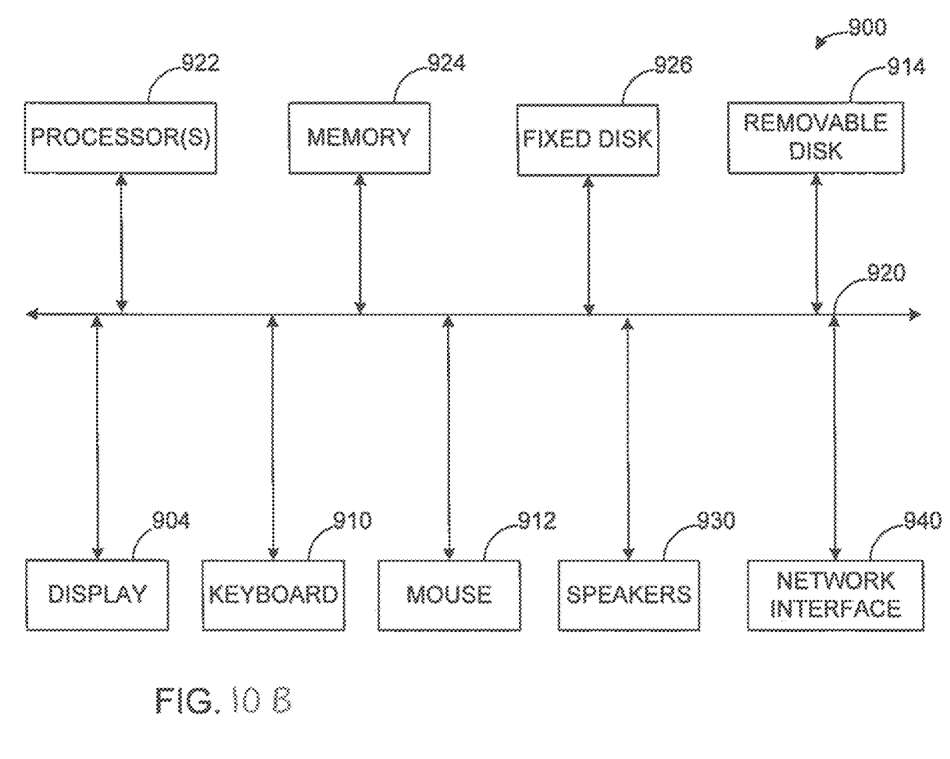

FIGS. 10A and 10B illustrate a computer system 900 suitable for implementing embodiments of the present invention. FIG. 10A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 10B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU, and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary mass storage medium (such as a hard disk, a solid-state drive, a hybrid drive, flash memory, etc.) that can be slower than primary storage but persists data. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A data processing method of an apparatus, the method comprising:
   transmitting, by the apparatus to an electronic device, a performance parameter associated with a machine learning analytics task;
   obtaining, from the electronic device by the apparatus, a set of time-series user data that is compressed, wherein:
   the set of time-series user data is compressed using a compression parameter that is determined based on (i) the performance parameter based on a level of accuracy for the machine learning analytics task and (ii) a privacy parameter based on an input from a user associated with the set of time-series user data, and
   the set of time-series user data is compressed based on a reduction of a quantity of dimensions of the set of time-series user data according to a matrix, wherein each element in the matrix is from a normal distribution;
   transforming, by the apparatus, the compressed set of time-series user data as a function of the privacy parameter for differential privacy when the compressed set of time-series user data was not previously transformed by the electronic device;
   performing, by the apparatus, the machine learning analytics task on the transformed set of time-series user data;
   providing, by the apparatus to the user associated with the set of time-series user data, a service based on an output of the machine learning analytics task; and
   coordinating, by the apparatus, with the electronic device, the performance parameter, the privacy parameter, and the compression parameter, so that a quality of the service does not degrade and a level of privacy and the level of accuracy are maintained.

2. The method as recited in claim 1, wherein:
   the set of time-series user data is obtained from one or more sensors of the electronic device, and
   the set of time-series user data is compressed on the electronic device.

3. The method as recited in claim 1, wherein the set of time-series user data is compressed using random projections.

4. The method as recited in claim 1, wherein a Euclidean distance between a first time series and a second time series of the set of time-series user data is preserved.

5. The method as recited in claim 3, wherein the set of time-series user data is compressed as a function of a higher value of the privacy parameter.

6. The method as recited in claim 1, wherein when the set of time-series user data represents health data, the service indicates health anomalies associated with the user and when the set of time-series user data represents power consumption, a generation of electricity or a time-based electricity rates associated with the power consumption is adjusted.

7. A non-transitory computer-readable medium comprising a program that, when executed by a processor of an apparatus, is configured to cause the processor to:
   transmit, by the apparatus to an electronic device, a performance parameter associated with a machine learning analytics task;
   obtain, from the electronic device by the apparatus, a set of time-series user data that is compressed, wherein:
   the set of time-series user data is compressed using a compression parameter that is determined based on (i) the performance parameter based on a level of accuracy for the machine learning analytics task and (ii) a privacy parameter based on an input from a user associated with the set of time-series user data, wherein the set of time-series user data is compressed using the compression parameter, and
   the set of time-series user data is compressed based on a reduction of a quantity of dimensions of the set of time-series user data according to a matrix, wherein each element in the matrix is from a normal distribution;
   transform, by the apparatus, the compressed set of time-series user data as a function of the privacy parameter for differential privacy when the compressed set of time-series user data was not previously transformed by the electronic device;
   perform, by the apparatus, the machine learning analytics task on the transformed set of time-series user data;
   provide, by the apparatus to the user associated with the set of time-series user data, a service based on an output of the machine learning analytics task; and
   coordinate, by the apparatus, with the electronic device, the performance parameter, the privacy parameter, and the compression parameter, so that a quality of the service does not degrade and a level of privacy and the level of accuracy are maintained.

8. The non-transitory computer-readable medium as recited in claim 7, wherein:
the set of time-series user data is obtained from one or more sensors of the electronic device, and
the set of time-series user data is compressed and transformed on the electronic device.

9. The non-transitory computer-readable medium as recited in claim 7, wherein the set of time-series user data is compressed using random projections.

10. The non-transitory computer-readable medium as recited in claim 7, wherein a Euclidean distance between a first time series and a second time series of the set of time-series user data is preserved.

11. The non-transitory computer-readable medium as recited in claim 9, wherein the set of time-series user data is compressed as a function of a higher value of the privacy parameter.

12. The non-transitory computer-readable medium as recited in claim 7, wherein when the set of time-series user data represents health data, the service indicates health anomalies associated with the user and when the set of time-series user data represents power consumption, a generation of electricity or a time-based electricity rates associated with the power consumption is adjusted.

13. An apparatus for transforming data, said apparatus comprising:
a transmitter configured to transmit, to an electronic device, a performance parameter associated with a machine learning analytics task;
a receiver configured to obtain a set of time-series user data that is compressed, wherein:
the set of time-series user data is compressed using a compression parameter that is determined based on (i) the performance parameter based on a level of accuracy for the machine learning analytics task and (ii) a privacy parameter based on an input from a user associated with the set of time-series user data, and the set of time-series user data is compressed based on a reduction of a quantity of dimensions of the set of time-series user data according to a matrix;
a memory configured to store the set of time-series user data; and
a processor configured to:
transform the compressed set of time-series user data as a function of the privacy parameter for differential privacy when the compressed set of time-series user data was not previously transformed by the electronic device, wherein each element in the matrix is from a normal distribution,
perform the machine learning analytics task on the transformed set of time-series user data,
provide, to the user associated with the set of time-series user data, a service based on an output of the machine learning analytics task, and
coordinate, by the apparatus, with the electronic device, the performance parameter, the privacy parameter, and the compression parameter, so that a quality of the service does not degrade and a level of privacy and the level of accuracy are maintained.

14. The apparatus as recited in claim 13, wherein:
the set of time-series user data is obtained from one or more sensors of the electronic device, and
the set of time-series user data is compressed on the electronic device.

15. The apparatus as recited in claim 13, wherein the set of time-series user data is compressed using random projections.

16. The apparatus as recited in claim 13, a Euclidean distance between a first time series and a second time series of the set of time-series user data is preserved.

17. The apparatus as recited in claim 13, wherein when the set of time-series user data represents health data, the service indicates health anomalies associated with the user and when the set of time-series user data represents power consumption, a generation of electricity or a time-based electricity rates associated with the power consumption is adjusted.

\* \* \* \* \*